UNITED STATES PATENT OFFICE.

WILLIAM MORGAN BROWN, OF LONDON, ENGLAND, ASSIGNEE OF JOHN LIGHTFOOT.

IMPROVEMENT IN DYEING AND PRINTING TEXTILE FABRICS.

Specification forming part of Letters Patent No. 111,654, dated February 7, 1871; reissue No. 7,432, dated December 12, 1876; application filed December 6, 1876.

DIVISION D.

*To all whom it may concern:*

Be it known that JOHN LIGHTFOOT, late of Lowerhouse, near Burnley, in the county of Lancaster, England, chemist, invented a new and useful Improvement in Printing and Dyeing Textile Fabrics and Yarns, whereof the following is a full and exact description.

This improvement relates to the preparation of mixtures suitable for printing or dyeing textile fabrics or yarns, so as to produce or develop therein the color known as "aniline-black;" and it consists in the employment within such color-mixtures of a metal not before discovered to be available as an active constituent thereof.

Prior to the invention herein set forth color-mixtures for aniline-black consisted, essentially, of three ingredients, to wit: first, a salt of aniline, usually the chloride; second, an oxidizing salt, such as chlorate of potash; third, a metallic salt, preferably that of copper; and in the specification of the original Letters Patent upon which this reissue is founded there are described certain specific modes of preparing such color-mixtures wherein other alkaline chlorates are employed; but the improvement which constitutes the subject-matter hereof originated in the discovery that one or more of the soluble salts, oxides, or sulphides of uranium, or the metal itself in a fine state of division, could be substituted for the other metals or metallic salts theretofore used in color-mixtures for aniline-black to efficiently accomplish the same purpose; and The invention herein claimed, therefore, is—

A color-mixture for aniline-black, containing as active constituents a salt or salts of aniline, an alkaline chlorate, or other suitable oxidizing agent, and uranium, or one or more of its salts, oxides, or sulphides.

WILLIAM MORGAN BROWN.

Witnesses:

S. C. HOPPER,
38 *Southampton Buildings, Chancery Lane, London.*

C. HAMMOND,
38 *Southampton Buildings, London.*